United States Patent
Silva

(10) Patent No.: US 11,180,859 B2
(45) Date of Patent: Nov. 23, 2021

(54) PROCESS AND APPARATUS FOR THE PRODUCTION OF HYDROGEN

(71) Applicant: CGE ENERGY LIMITED, Selby (GB)

(72) Inventor: Nuno Miguel Machado Costa Da Silva, Ramsgate (GB)

(73) Assignee: CGE ENERGY LIMITED, Selby (GB)

( * ) Notice: Subject to any disclaimer, the term of this patent is extended or adjusted under 35 U.S.C. 154(b) by 0 days.

(21) Appl. No.: 17/284,464

(22) PCT Filed: Oct. 8, 2019

(86) PCT No.: PCT/GB2019/052854
§ 371 (c)(1),
(2) Date: Apr. 10, 2021

(87) PCT Pub. No.: WO2020/074886
PCT Pub. Date: Apr. 16, 2020

(65) Prior Publication Data
US 2021/0310134 A1    Oct. 7, 2021

(30) Foreign Application Priority Data
Oct. 10, 2018 (GB) .................................... 1816521

(51) Int. Cl.
*H01M 4/02* (2006.01)
*C25B 1/04* (2021.01)
(Continued)

(52) U.S. Cl.
CPC .............. *C25B 1/04* (2013.01); *B23K 10/00* (2013.01); *C25B 9/19* (2021.01); *F02G 1/053* (2013.01);
(Continued)

(58) Field of Classification Search
CPC ...................................................... H01M 4/02
See application file for complete search history.

(56) References Cited

U.S. PATENT DOCUMENTS 5,358,696 A  10/1994  Jahnke
5,840,270 A  11/1998  Werth
(Continued)

FOREIGN PATENT DOCUMENTS

CN  1093759 A  10/1994
CN  2249251 Y   3/1997
(Continued)

OTHER PUBLICATIONS

Great Britain Combined Search and Examination Report, GB Application No. 1816521.7, dated Mar. 29, 2019, 6 pages.
(Continued)

*Primary Examiner* — Jacob B Marks
(74) *Attorney, Agent, or Firm* — Stinson LLP

(57) ABSTRACT

A process and apparatus for the production of hydrogen There is provided a process for the production of hydrogen, the process comprising: electrolysing water in an electrolytic cell to produce hydrogen gas and oxygen gas, the electrolytic cell having a first outlet for hydrogen gas; passing the hydrogen gas from the first outlet of the electrolytic cell to a reaction chamber, the reaction chamber comprising a first inlet for receiving the hydrogen gas from the electrolytic cell and a second outlet for hydrogen gas passing out of the reaction chamber, the reaction chamber containing one or more pieces of a metal or an alloy thereof at least partially submerged in an alkali solution, wherein the first inlet is arranged so that the hydrogen gas bubbles through the alkali solution; passing the hydrogen gas from the second outlet to a gas-cleaning chamber, the gas-cleaning chamber comprising a second inlet for receiving hydrogen gas from the reaction chamber and a third outlet for hydrogen gas passing (Continued)

Figure 1:
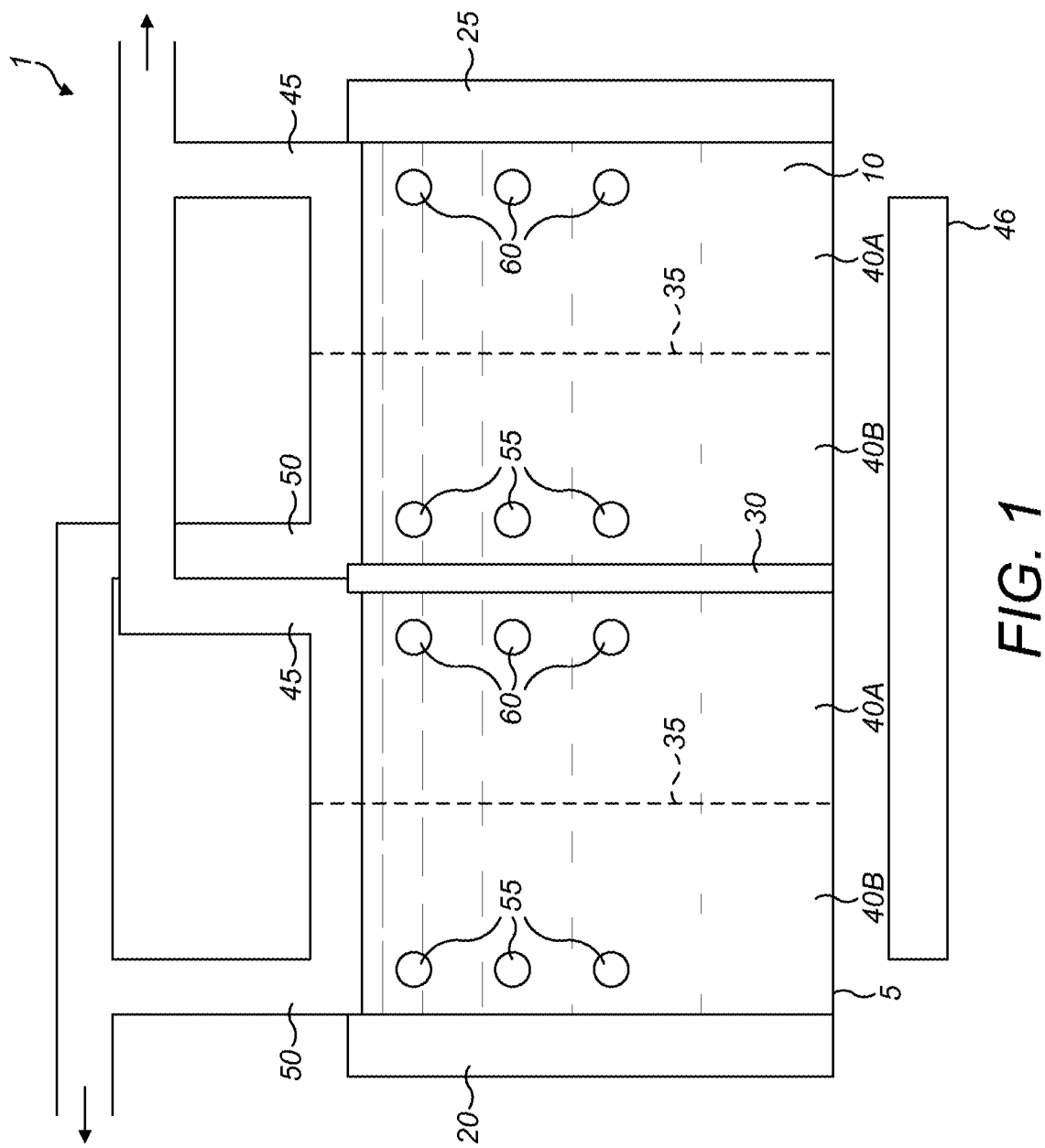

out of the cleaning chamber, the gas-cleaning chamber containing an aqueous solution, wherein the second inlet is arranged so that the hydrogen gas bubbles through the aqueous solution; and recovering hydrogen gas from the third outlet.

26 Claims, 2 Drawing Sheets

(51) Int. Cl.
*C25B 9/19* (2021.01)
*B23K 10/00* (2006.01)
*F02G 1/053* (2006.01)
*F22B 1/00* (2006.01)
*H01M 8/0656* (2016.01)

(52) U.S. Cl.
CPC ........... *F22B 1/003* (2013.01); *H01M 8/0656* (2013.01); *H01M 2250/20* (2013.01)

(56) References Cited

U.S. PATENT DOCUMENTS

| | | |
|---|---|---|
| 2009/0252671 A1 | 10/2009 | Fullerton |
| 2009/0255826 A1 | 10/2009 | McWhinney et al. |
| 2013/0168239 A1 | 7/2013 | Vancina |

FOREIGN PATENT DOCUMENTS

| | | |
|---|---|---|
| CN | 1146501 A | 4/1997 |
| CN | 101381073 A | 3/2009 |
| JP | 2003328169 A | 11/2003 |
| JP | 2004-210591 * | 7/2004 |
| JP | 2004210591 A | 7/2004 |
| KR | 20120128467 A | 11/2012 |
| KR | 20160045032 A | 4/2016 |
| WO | 2008141369 A1 | 11/2007 |
| WO | 2008141369 A1 | 11/2008 |

OTHER PUBLICATIONS

Soler et al., "Aluminium and aluminum alloys as sources of hydrogen for fuel fell applications," Journal of Power Sources, 169, 2007, pp. 144-149.
Porciuncula et al., "Production of hydrogen in the reaction between aluminum and water in the presence of NaOH and KOH," Brazilian Journal of Chemical Engineering, vol. 29, No. 2, Apr./Jun. 2012, 13 pages.
International Search Report and Written Opinion, PCT/GB2019/052854, dated Feb. 13, 2020, 12 pages.
Great Britain Search Report, GB Application No. 1816521.7, dated Mar. 29, 2019, 1 page.
Ding Tao et al., "Common knowledge evidence: Basic Chemistry," University of Electronic Science and Technology of China Press, Aug. 2018, first edition, p. 107.

* cited by examiner

PROCESS AND APPARATUS FOR THE PRODUCTION OF HYDROGEN

REFERENCE TO RELATED APPLICATIONS

This application is a U.S. national stage application of International Patent Application No. PCT/GB2019/052854, filed Oct. 8, 2019, which claims the benefit of United Kingdom Patent Application No. 1816521.7, filed Oct. 10, 2018, the entire disclosures of which are incorporated herein by reference.

This disclosure relates to a process and apparatus for the production of hydrogen. In particular, the disclosure provides a source of suitably clean and pure hydrogen gas for use in a range of applications, including mobile energy generation systems.

New methods to generate energy have been investigated in the last decade due to concerns about the depletion of fuels. Hydrogen energy, which can be environmentally friendly and sustainable, has attracted great attention from researchers for its promising applications. Water electrolysis in particular, in conjunction with renewable electricity (from wind, photovoltaics, tide, etc.), can provide a "zero emission" source of hydrogen.

The use of hydrogen to generate energy is desirable because it has a high calorific power that is approximately 2.5 times the value of gasoline. Its combustion in the presence of pure oxygen is completely clean with the concomitant formation of water. Hydrogen also has the capacity to be produced in situ or on demand, according to local energy needs.

Traditionally, hydrogen is produced by methanol steam reforming, which needs high temperature and pressure. In addition, the obtained $H_2$ gas will typically be contaminated with CO, which will poison fuel cell catalysts and make them quickly deteriorate during operation.

Traditional water electrolysis is a well-established commercial technology for ultra-pure $H_2$ production. Technologies for electricity generation from renewable energy (wind, photovoltaics, tide, etc.) have been widely developed, but the current electricity production fails to well match the energy demands on the temporal scale. Therefore, there has been a focus on using electricity to produce hydrogen under mild conditions outside of peak electricity usage times.

However, traditional electrolysis has several limitations for the mass production of $H_2$. Firstly, it involves costly electrical energy consumption. Secondly, any crossover effect that contaminates $H_2$ with the $O_2$ produced puts the process at a risk of implosion. Furthermore, the heavy use of chemical reagents also adds to the cost of development.

To decrease the energy consumption, several strategies have been researched. The first strategy is to reduce the ohmic losses. The lower ohmic loss allows the electrolysis system to be operated under larger current density with higher hydrogen production efficiency and purity.

The second strategy is to develop electrolyte catalysts with high activity and stability. The standard potential for water electrolysis is 1.23 V, which means the water splitting is a strongly uphill reaction. Although large numbers of excellent electrocatalysts for hydrogen evolution reaction or oxygen evolution reaction have been reported, the cell of water electrolysis still needs 1.6-2.0 V to operate. This is mainly because the anodic oxygen evolution reaction process of water electrolysis is kinetically slow and needs enhanced overpotentials to drive.

"Production of hydrogen in the reaction between aluminium and water in the presence of NaOH and KOH", Porciúncula et. al., Braz. J. Chem. Eng. vol. 29 no. 2 São Paulo April/June 2012, discloses the production of hydrogen from the reaction of aluminium with water.

"Aluminium and aluminium alloys as sources of hydrogen for fuel cell applications", Soler et. al., Journal of Power Sources 169 (2007) 144-149, discloses the production of hydrogen from aluminium and aluminium alloys with aqueous alkaline solutions.

CN2249251 discloses an electrolytic cell comprising hydrogen-oxygen separating films made of a nylon-terylene blend fabric.

Accordingly, it is desirable to provide an improved method of producing hydrogen and an apparatus therefore, and/or to tackle at least some of the problems associated with the prior art or, at least, to provide a commercially viable alternative thereto.

In a first aspect there is provided a process for the production of hydrogen, the process comprising:
 electrolysing water in an electrolytic cell to produce hydrogen gas and oxygen gas, the electrolytic cell having a first outlet for hydrogen gas;
 passing the hydrogen gas from the first outlet of the electrolytic cell to a reaction chamber, the reaction chamber comprising a first inlet for receiving the hydrogen gas from the electrolytic cell and a second outlet for hydrogen gas passing out of the reaction chamber, the reaction chamber containing one or more pieces of a metal or an alloy thereof at least partially submerged in an alkali solution, wherein the first inlet is arranged so that the hydrogen gas bubbles through the alkali solution;
 passing the hydrogen gas from the second outlet to a gas-cleaning chamber, the gas-cleaning chamber comprising a second inlet for receiving hydrogen gas from the reaction chamber and a third outlet for hydrogen gas passing out of the cleaning chamber, the gas-cleaning chamber containing an aqueous solution, wherein the second inlet is arranged so that the hydrogen gas bubbles through the aqueous solution; and
 recovering hydrogen gas from the third outlet.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present invention provides for the electrolytic production of hydrogen in a manner which is supplemented by the chemical production of hydrogen from a metal, such as aluminium. This "chemically-assisted" hydrogen production gives rise to useful value-adding byproducts, such as aluminium hydroxide.

The process is for the production of hydrogen. The process comprises a first step of electrolysing water in an electrolytic cell to produce hydrogen gas and oxygen gas. The electrolysis of water is a well-known technique and involves the application of an electrical potential through an aqueous solution. Any standard electrolysis apparatus can be used, although a preferred design is described herein.

A preferred electrolytic cell has an anode at one side and a cathode at the other, with an ionic solution in between. The electrolysis unit relies upon an ionic solution, which is an aqueous solution containing an electrolyte, to improve the electrical conductivity of the solution. The increased conductivity of the solution increases the rate at which the electrolysis reaction can proceed, increasing the decomposition of the water component and increasing the hydrogen yield per unit time. Preferably the ionic solution in the electrolysis unit has conductivity of at least 0.25 S/cm, more preferably at least 0.5 S/cm and most preferably from 0.5 to 1 S/cm. The conductivity of the ionic solution can be measured using conventional equipment and should be measured at 20° C.

A preferred ionic solution for use in the electrolysis unit is an alkali solution, such as KOH or NaOH. Such a solution would preferably have a concentration of at least 0.1M, preferably at least 0.2M and most preferably about 0.3M. As explained below, this ionic solution can be recycled from later stages of the process.

According to one embodiment, the ionic solution may be supplemented with aluminium hydroxide or another soluble metal hydroxide (in addition to the alkali such as KOH or NaOH). The amount of added metal hydroxide is preferably present in an amount of at least 0.0001M, such as from 0.001 to 0.01M. This has a number of key advantages. Firstly, it improves the electrolysis reaction because it has a strong urge to react with oxygen and other impurities. This means that the addition sequestrates some water impurities and slightly increases the purity of $H_2$ production. It can also provides a small process temperature increase. Furthermore, the metal hydroxide can be readily obtained as a by-product of the process as a whole; for example, aluminium hydroxide can be used where Aluminium is used as the metal in the reaction chamber discussed below. Thus the metal hydroxide can be recovered from the reaction chamber. For example, a 0.001M solution of Aluminium Hydroxide can be obtained by dissolving 1 g of AlOH in 20 L of KOH solution.

Within the ionic solution in the electrolytic cell there are typically provided a plurality of neutral plates. These neutral plates are preferably parallel with each other and the electrodes, and equally spaced. These act to divide the voltage experienced by the ionic solution into smaller steps, like a plurality of individual sub-cells in series, and thereby reduce the corrosive wear on the electrodes. Hydrogen is produced at the cathode and oxygen at the anode. In addition, in each "sub-cell", hydrogen is produced on the cathode-side and oxygen at the anode-side on the neutral plates.

As the oxygen and hydrogen are produced they bubble out of the ionic solution as gases. The electrolytic cell has means for collecting hydrogen gas from each cathode-side of each "sub-cell" and for collecting oxygen gas from each anode-side of each "sub-cell". Preferably a membrane is provided in between the anode and cathode which prevents cross-contamination of the hydrogen with the oxygen gas. Where neutral plates are included within the electrolytic cell, a separate membrane would be provided between each neutral plate and between the anode and the adjacent neutral plate and between the cathode and the adjacent neutral plate.

The present inventors have found that the use of such a membrane improves the safety and yield of the system. Moreover, a costly type of membrane is not required and the membrane can be a mesh membrane. Such a mesh membrane can be readily selected to be impervious to the gaseous oxygen and hydrogen species, without hindering flow of the liquid electrolyte. This is particularly the case with the fast bubbling of the gases away from the electrode surfaces. The mesh membrane is preferably a polymer mesh membrane and can be selected depending on the ionic solution being employed for chemical compatibility. A nylon mesh is preferred for KOH(aq) as the ionic solution and a polyester mesh is preferred for NaOH(aq) as the ionic solution.

A preferred Nylon Monofilament Mesh has between 300 to 500 cross-counts per inch. The mesh forms a thin wall that allows the water to pass through it, but not the bubbles. The H and O ions can pass through the water, cross the membrane, and form the gas on the electrode plate they are attracted to (positive or negative). The Hydrogen stays on the negative side of the membrane wall, and the oxygen stays on the positive side. The mesh is a dividing wall; it forms/separates two chambers. The gases rise to the top of their respective side of the chamber and collect at the top.

The electrolytic cell has a first outlet for hydrogen gas. The outlet is for passing the hydrogen gas collected from the electrolytic cell for onwards processing. The outlet may pass to a flash-back inhibitor to prevent damage of the electrolytic cell if a critical level of oxygen enters the system and risks implosion. However, when using the membrane as described above, the oxygen contamination of the hydrogen is reduced or avoided, such that the risk of implosion is reduced.

The process comprises a further step of passing the hydrogen gas from the first outlet of the electrolytic cell to a reaction chamber. The reaction chamber comprises a first inlet for receiving the hydrogen gas from the electrolytic cell and a second outlet for hydrogen gas passing out of the reaction chamber.

The reaction chamber contains one or more pieces of metal or an alloy thereof at least partially submerged in an alkali solution. Metals or alloys (which contain metals) react with alkali to produce hydrogen and metal oxides or hydroxides. The metal or alloy selected should be used in combination with an alkali having sufficient concentration for such a reaction to proceed. The metal or alloy preferably comprises aluminium or steel.

For Aluminium, which is preferred in the present invention, a strong alkali solution is required because this metal has a very thin passive layer of $Al_2O_3$ on its surface that prevents the direct attack of water molecules.

The alkali is not consumed in the reaction and acts as a catalyst, it can be fully recovered. This is because the aluminate salts produced in the hydrogen generation undergo a decomposition reaction that regenerates the alkali. The reactions of aluminium with potassium hydroxide in aqueous solution to produce hydrogen are as follows:

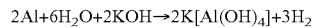

$$2Al+6H_2O+2KOH \rightarrow 2K[Al(OH)_4]+3H_2$$

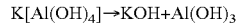

$$K[Al(OH)_4] \rightarrow KOH+Al(OH)_3$$

The reaction between aluminium and water obeys the following stoichiometry. Thus, only aluminium and water are the consumed raw materials to produce hydrogen:

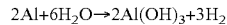

$$2Al+6H_2O \rightarrow 2Al(OH)_3+3H_2$$

If necessary, the $K[Al(OH)_4]$ product can also be treated with acid, such as sulphuric acid to recover the aluminium hydroxide.

The form of the metal or alloy is not especially important. However, the present invention provides a useful opportunity to recycle waste or scrap metal sources, such as aluminium cans. In addition, it is desirable that the metal has a high surface area, such that the reaction can proceed at a reasonable rate. Accordingly, the metal is preferably processed to have a high surface to weight ratio. In the case of aluminium scrap, such as cans, these can be crushed or fragmented into shards. Preferably the metal or metal alloy is provided as a plurality of pieces, each piece having a weight of less than 0.1 kg.

The alkali solution is preferably KOH or NaOH and preferably has a concentration of at least 1M, such as from 1 to 5M.

The first inlet is arranged so that the hydrogen gas bubbles through the alkali solution. That is, the first inlet is submerged below the level of the alkali solution. The hydrogen gas can preferably enter the alkali solution through a single point, or through a shower-head type nozzle to distribute the bubbles.

The inventors have found that this is especially important, since the agitation of the metal/alkali system increases the reaction rate and hydrogen production. As will be appreciated, the combination with the fuel cell provides agitation of the reaction chamber without requiring additional complex equipment, such as a stirrer, or further energy input. Without wishing to be bound by theory, it is understood that agitation enhances the reaction as it allows the solution to mix well and creates more surface for reaction. Thus, the agitation creates a higher possibility for the aluminium-water reaction to occur and enables a more efficient process in both hydrogen production and energy efficiency.

The gas leaving the second outlet is the hydrogen gas obtained from the fuel cell, supplemented by the hydrogen gas produced in the reaction chamber from the alkali reaction with the metal. This means that, in comparison to a conventional fuel cell, the hydrogen production yield can be increased. The reaction chamber is a component of the system which can be replaced when spent and therefore acts as a supplemental battery-like hydrogen source. Furthermore, the alkali-reacted metal in the form of an oxide or hydroxide can be a useful product.

Aluminium is especially preferred as the metal (and alloys of aluminium can also be employed). There are several advantages of using aluminium. Its by-product, $Al(OH)_3$, may be used to produce other aluminium salts as a useful by-product, including the use of electrolysis to recover Al metal. The aluminium used in the reaction can be obtained from recyclable materials, such as soft drink or beer cans. Moreover, it reacts with readily and cheaply available alkali sources, such as KOH and NaOH. The hydrogen generated by reaction above is pure and suitable for high purity applications.

Preferably the process further comprises recovering a metal oxide or metal hydroxide from the reaction chamber. Preferably the process further comprises treating the metal oxide or metal hydroxide to recover the metal. Aluminium can be regenerated from aluminium hydroxide, by two processes developed in the late 1800s: the Bayer process which produces pure alumina from bauxite ore, and the Hall-H'eroult process which produces aluminium from alumina.

The process comprises a further step of passing the hydrogen gas from the second outlet of the reaction chamber to a gas-cleaning chamber. The hydrogen gas leaving the reaction chamber may have entrained some of the ionic solution and/or some of the alkali solution as a vapour. This is an undesirable contaminant in the system which reduces the utility of the hydrogen gas produced. The gas-cleaning chamber serves to remove such vapours.

The gas-cleaning chamber comprises a second inlet for receiving hydrogen gas from the reaction chamber and a third outlet for hydrogen gas passing out of the cleaning chamber.

The gas-cleaning chamber contains an aqueous solution. This is typically just water. However, over time vapourised ionic solution and/or alkali solution entrained with the hydrogen will become trapped in the water. Where the system uses the same reagent to provide the ionic solution in the electrolytic cell and the alkali solution in the reaction chamber (such as KOH), the water will become a weak solution of this reagent. Once levels reach a sufficiently high concentration, the water can be swapped. Preferably the process further comprises recycling spent aqueous solution from the gas-cleaning chamber to the electrolytic cell for use as at least a portion of the ionic solution. That is, the contaminated water can be used to make fresh ionic solution for the electrolysis cell to recycle the reagent, such as KOH.

The second inlet is arranged so that the hydrogen gas bubbles through the aqueous solution. That is, the first inlet is submerged below the level of the aqueous solution. The hydrogen gas can preferably enter the aqueous solution through a single point, or through a shower-head type nozzle to distribute the bubbles and enhance the cleaning.

The process permits the recovery of hydrogen gas from the third outlet. The third outlet represents the product stream from the process. From the gas-cleaning chamber there is obtained a flow of hydrogen between 1 to 5 bar, which is ready to be used as a new source of energy for different type of applications from fuel cells, pyrolysis, heating, cooking, welding, cutting, polishing and engines decarbonization.

Preferably the process further comprises recovering oxygen from the electrolytic cell. This can be a useful commercial product. Alternatively it can be released into the atmosphere.

According to a further aspect there is provided an apparatus for producing hydrogen, the apparatus comprising:
- an electrolytic cell for the electrolysis of water to produce hydrogen and oxygen gas, the electrolytic cell having a first outlet for hydrogen gas;
- a reaction chamber comprising a first inlet in fluid communication with the first outlet, and a second outlet; and
- a gas-cleaning chamber comprising a second inlet in fluid communication with the second outlet, and a third outlet for the produced hydrogen gas,
- wherein the reaction chamber contains one or more pieces of a metal or an alloy thereof at least partially submerged in an alkali solution, and wherein the first inlet is for bubbling hydrogen gas through the alkali solution;
- wherein the gas-cleaning chamber contains an aqueous solution, and wherein the second inlet is for bubbling hydrogen gas through the aqueous solution.

All elements as described in the first aspect can be applied and understood equally in this further aspect and vice versa.

Preferably the electrolytic cell further comprises a magnetron for treating water within the electrolytic cell. Treating the electrolyte with a magnetron allows for the water to be in a natural frequency allowing the hydrolysis cell to add smaller amounts of electricity to break down the water molecule. This reduces the overpotential required for the electrolytic cell.

Preferably the electrolytic cell comprises a cathode and an anode and a plurality of neutral plates arranged therebetween, each neutral plate being separated from each adjacent neutral plate by a volume for holding an electrolytic solution, wherein said volume contains a mesh membrane to thereby define a cathode-side volume and an anode-side volume, wherein each cathode-side volume is in fluid communication with the first outlet, and wherein the mesh membrane is substantially impervious to gaseous oxygen and hydrogen. Preferably the mesh membrane is a mesh membrane, preferably a nylon mesh membrane.

The mesh membrane can significantly lower the costs and largely enhance the stability of chemicals-assisted hydrogen electrocatalytic reaction. The mesh membrane forms a thin wall that allows the water to pass through it, but not the bubbles. Oxygen bubbles form at the anode and hydronium ions pass through the water, cross the membrane, and form the hydrogen gas on the cathode. The hydrogen stays on the negative side of the membrane wall, and the oxygen stays on the positive side. The mesh membrane is a dividing wall forming and separating two chambers. The gases rise to the top of their respective side of the chamber and collect at the top and leave by their respective outlets.

Preferably the apparatus further comprises a flashback arrestor arranged between and in fluid communication with the first outlet and the first inlet.

Preferably the apparatus comprises a plurality of interchangeable reaction chambers. These can be removed and replaced when spent. Thus the continuous production of hydrogen from the fuel cell can be coupled to the batchwise reaction of the metal.

Preferably the apparatus further comprises a first sensor in communication with the first inlet and a second sensor in communication with the second outlet, wherein the first and second sensors are for determining hydrogen gas flow-rates. This allows the operator to determine when the metal has fully reacted.

According to a further aspect there is provided an apparatus for producing hydrogen, the apparatus comprising a reaction chamber comprising a second outlet; and
  a gas-cleaning chamber comprising a second inlet in fluid communication with the second outlet, and a third outlet for the produced hydrogen gas,
  wherein the reaction chamber contains one or more pieces of a metal or an alloy thereof at least partially submerged in an alkali solution;
  wherein the gas-cleaning chamber contains an aqueous solution, and wherein the second inlet is for bubbling hydrogen gas through the aqueous solution.

The apparatus of this aspect relates to the reaction chamber as described above, coupled with a gas-cleaning system to avoid the carry-over of alkali solution in the hydrogen product.

According to a further aspect there is provided a vehicular diesel or petrol engine comprising the apparatus as described above, wherein the third outlet is arranged to supply hydrogen gas to a combustion chamber of the engine. That is, a vehicular diesel or petrol engine provided with the apparatus of the first aspect or the further aspect involving an apparatus comprising a reaction chamber comprising a second outlet; and
  a gas-cleaning chamber comprising a second inlet in fluid communication with the second outlet, and a third outlet for the produced hydrogen gas,
  wherein the reaction chamber contains a metal or an alloy at least partially submerged in an alkali solution;
  wherein the gas-cleaning chamber contains an aqueous solution, and wherein the second inlet is for bubbling hydrogen gas through the aqueous solution.

In both embodiments the apparatus provides a source of hydrogen for supplementing the combustion of the fuel. This is particularly advantageous since the hydrogen burns hot meaning that particulate emissions from the engine are reduced and fuel usage is reduced. Preferably the engine comprises a system for monitoring the engine performance and controlling the hydrogen usage.

In embodiments which only provide a reaction chamber and do not involve an electrolysis cell, the agitation required to promote the hydrogen production can advantageously be obtained by the motion and vibration of the vehicle containing the engine and reaction chamber. Advantageously the reaction chamber can be swapped out to provide a fresh source of hydrogen fuel and the spent metal (such as aluminium hydroxide) can be recovered for further processing.

According to a further aspect there is provided an electrical generator comprising a fuel cell, preferably a vehicular electrical generator, comprising the apparatus as described herein, wherein the third outlet is arranged to supply hydrogen gas to the fuel cell.

The method and apparatus described herein has several significant advantages over traditional water electrolysis. Firstly, there is a lower energy cost or "near zero" energy cost if renewable sources are used. Second, higher value added products which can be obtained from the reaction chamber which is particularly advantageous where the metal used is recycled metals coming from the solid waste cycle. Thirdly the process can provide increased safety by preventing the $O_2$ contamination of the desirable pure $H_2$, and thus eliminating the danger of possible implosion. Fourthly, it has a low cost since it can rely on a lower cost customized nylon monofilament mesh membrane with hundreds of cross-counts only for added purity of $H_2$. The process produces highly pure hydrogen, oxygen and aluminum hydroxide.

According to a further aspect there is provided a cooking device comprising the apparatus according to one of the aspects described above and a burner head, wherein the third outlet is arranged to supply hydrogen gas to the burner head. The burner head may, for example, be a cooking ring for a conventional gas-hob.

According to a further aspect there is provided a welding device or a plasma cutting device comprising the apparatus according to one of the aspects described above and a gas torch, wherein the third outlet is arranged to supply hydrogen gas to the gas torch. The gas torch may take the form of a conventional oxyacetylene torch or a mono-gas torch.

According to a further aspect there is provided a heating boiler comprising the apparatus according to one of the aspects described above and a combustion chamber comprising a pilot flame, wherein the third outlet is arranged to supply hydrogen gas to the combustion chamber of the boiler. Designs of suitable boilers are well known.

According to a further aspect there is provided a Stirling engine comprising the apparatus according to one of the aspects described above and a heat engine, wherein the third outlet is arranged to supply hydrogen gas to the heat engine. The heat engine uses a burner head and the Stirling engine operates by a cyclic compression and expansion of air or other gas (the working fluid) at different temperatures, such that there is a net conversion of heat energy to mechanical work.

Figure 2:
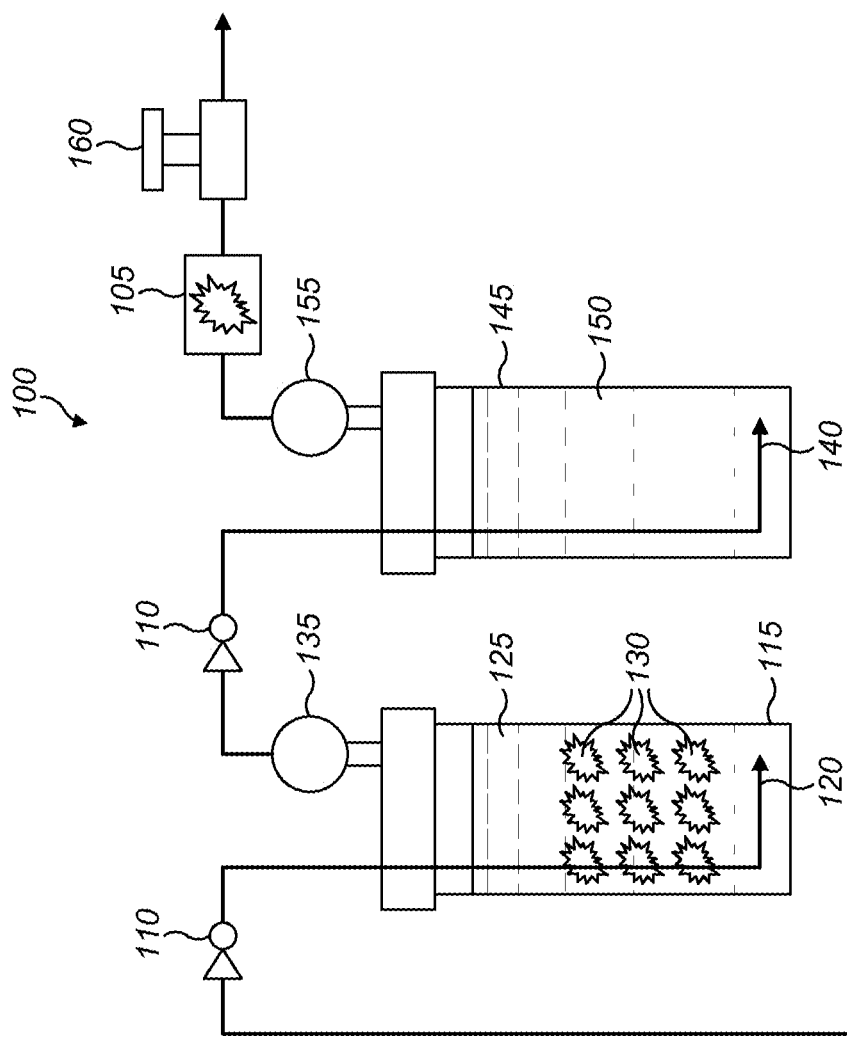

The invention will now be described in relation to the following non-limiting figures, in which:
  FIG. 1 shows an electrolytic cell as described herein.
  FIG. 2 shows an apparatus as described herein.
  FIG. 1 shows an electrolytic cell 1. The cell 1 comprises a tank 5 for holding ionic aqueous fluid 10, such as KOH. The system preferably uses purified water with 30% electrolyte 1M KOH standard solution to achieve the necessary conductivity for optimal performance.

The cell 1 is provided with an anode 20 and a cathode 25 provided at each end of the tank 5. The cathode 25 and anode 20 are connected to an external circuit (not shown) which provides the driving force for electrolysis.

The tank 5 is divided by a neutral plate 30. This results in the formation of two sub-cells. The neutral plate may have holes to allow electrolyte circulation, or the electrolyte can be piped between the sides of the neutral plate 30.

The tank 5 is further divided by nylon mesh membranes 35 which are located between the neutral plate 30 and each of the anode 20 and cathode 25. This divides each of the two sub-cells so that they have a cathode-side volume 40A and an anode-side portion 40B.

A magnetron 46 is provided to energise the fluid 10 in the tank 5. This reduces the electrical potential that needs to be applied by the external circuit.

The tank 5 is provided with a plurality of gas outlets (45, 50). The hydrogen gas outlets 45 are provided in communication with the cathode-side volumes 40A of each sub-cell. The oxygen gas outlets 50 are provided in communication with the anode-side volumes 40B of each sub-cell.

In use, a voltage is applied between the cathode 25 and the anode 20. This causes the ionic fluid 10 to decompose. Oxygen gas bubbles 55 formed at the anode 20 and on the neutral plate 30 in the anode-side volumes 40B of each sub-cell. Hydrogen gas bubbles 60 are formed at the cathode 25 and on the neutral plate 30 in the cathode-side volumes 40A of each sub-cell. Produced oxygen gas can be stored as an output for different industrial application or just released to the atmosphere.

A preferred electrical circuit involves a Pulse Wave Modular working 12/24V and 0 to 140 A. Like a standard water electrolysis cell, the external circuit power provides the electrical potential to drive these reactions but with a much smaller power input.

The hydrogen gas bubbles 60 are collected at the hydrogen gas outlet 45. The oxygen gas bubbles 55 are collected at the oxygen gas outlet 50. The use of a membrane 35 as described herein also serves to prevent $O_2$ contamination in the produced $H_2$, thus avoiding the possible explosion.

Although a single neutral plate 30 is shown, typically a plurality of neutral plates 30 will be employed.

FIG. 2 shows an apparatus 100 incorporating the electrolytic cell 1 described above. The above numerals have been reused as appropriate.

The apparatus 100 takes hydrogen gas from the hydrogen gas outlet 45. This is passed through a flash-back inhibitor 105, past a non-return valve 110 and into a reaction chamber 115.

The reaction chamber 115 takes the form of a bubbler. That is, the hydrogen gas-inlet 120 in the reaction chamber 115 is arranged to introduce the hydrogen gas towards the bottom of the reaction chamber 115. The reaction chamber 115 contains 1M KOH solution 125 and fragments of aluminium scrap waste 130.

In use, the hydrogen gas bubbles through the KOH solution 125, agitating the solution 125 against the aluminium scrap waste 130. This encourages the reaction and the further production of hydrogen.

The hydrogen gas leaving the reaction vessel through the outlet 135 comprises gas from the electrolysis cell and additional hydrogen gas from the reaction chamber 115.

The hydrogen has leaving the reaction vessel through the outlet 135 is passed to an inlet 140 of a gas-cleaning chamber 145. The gas-cleaning chamber 145 contains water 150. The water 150 serves to capture any KOH solution 125 entrained from earlier in the apparatus.

Cleaned hydrogen gas leaves the gas-cleaning chamber 145 by the outlet 155 and a control valve 160 for use. The apparatus may be coupled with a hydrogen storage device (not shown) to allow the hydrogen to be used at a controlled rate.

A specific description of the structure of a suitable electrolytic cell is now provided. The layers are provided in order across the cell as follows (like terms describe identical components):

1. Acrylic plate 150×150 mm and 10 mm thickness, the plate having connections for the positive electrode, negative electrode, water input, hydrogen and oxygen output
2. Positive Plate (Inox 316 110×110 mm and 1.5 mm thickness)
3. Oxygen separator (A gasket with a connection to the Oxygen outlet)
4. Mesh Membrane (as described herein)
5. Normal Gasket
6. Hydrogen separator (A gasket with a connection to the hydrogen outlet)
7. Neutral Plate (Inox 316)
8. Oxygen separator
9. Mesh Membrane
10. Normal Gasket
11. Hydrogen separator
12. Neutral Plate
13. Oxygen separator
14. Mesh Membrane
15. Normal Gasket
16. Hydrogen separator
17. Neutral Plate
18. Oxygen separator
19. Mesh Membrane
20. Normal Gasket
21. Hydrogen separator
22. Neutral Plate
23. Oxygen separator
24. Mesh Membrane
25. Normal Gasket
26. Hydrogen separator
27. Negative Plate
28. Hydrogen separator
29. Acrylic plate 150×150 mm and 10 mm thickness Unless otherwise stated, all percentages herein are by weight and all pressures are absolute, rather than gauge.

Although preferred embodiments of the invention have been described herein in detail, it will be understood by those skilled in the art that variations may be made thereto without departing from the scope of the invention or of the appended claims.

The invention claimed is:

1. A process for the production of hydrogen, the process comprising:
   electrolysing water in an electrolytic cell to produce hydrogen gas and oxygen gas, the electrolytic cell having a first outlet for hydrogen gas;
   passing the hydrogen gas from the first outlet of the electrolytic cell to a reaction chamber, the reaction chamber comprising a first inlet for receiving the hydrogen gas from the electrolytic cell and a second outlet for hydrogen gas passing out of the reaction chamber, the reaction chamber containing one or more pieces of a metal or an alloy thereof at least partially submerged in an alkali solution, wherein the first inlet is arranged so that the hydrogen gas bubbles through the alkali solution;
   passing the hydrogen gas from the second outlet to a gas-cleaning chamber, the gas-cleaning chamber comprising a second inlet for receiving hydrogen gas from the reaction chamber and a third outlet for hydrogen gas passing out of the cleaning chamber, the gas-cleaning chamber containing an aqueous solution, wherein the second inlet is arranged so that the hydrogen gas bubbles through the aqueous solution; and recovering hydrogen gas from the third outlet.

2. A process according to claim 1, wherein the electrolytic cell contains an ionic solution having a conductivity of at least 0.25 S/cm.

3. A process according to claim 2, wherein the ionic solution comprises KOH(aq) having a concentration of at least 0.3 M.

4. A process according to claim 2, the ionic solution comprises Aluminium Hydroxide, or a metal hydroxide recovered from the reaction chamber, in a concentration of at least 0.0001 M.

5. A process according to claim 1, wherein the process further comprises recovering oxygen from the electrolytic cell.

6. A process according to claim 1, wherein the metal or alloy thereof comprises Aluminium.

7. A process according to claim 1, wherein the metal or alloy thereof is a scrap metal.

8. A process according to claim 1, wherein the reaction chamber contains a plurality of pieces of metal or alloy thereof, each have a weight of less than 0.1 kg.

9. A process according to claim 1, wherein the alkali solution comprises NaOH or KOH.

10. A process according to claim 1, wherein the process further comprises recovering a metal oxide or metal hydroxide from the reaction chamber.

11. A process according to claim 10, wherein the process further comprises treating the metal oxide or metal hydroxide to recover the metal.

12. A process according to claim 1, wherein the process further comprises recycling spent aqueous solution from the gas-cleaning chamber to the electrolytic cell.

13. An apparatus for producing hydrogen, the apparatus comprising:
an electrolytic cell for the electrolysis of water to produce hydrogen and oxygen gas, the electrolytic cell having a first outlet for hydrogen gas;
a reaction chamber comprising a first inlet in fluid communication with the first outlet, and a second outlet; and
a gas-cleaning chamber comprising a second inlet in fluid communication with the second outlet, and a third outlet for the produced hydrogen gas,
wherein the reaction chamber contains one or more pieces of a metal or an alloy thereof at least partially submerged in an alkali solution, and wherein the first inlet is for bubbling hydrogen gas through the alkali solution;
wherein the gas-cleaning chamber contains an aqueous solution, and wherein the second inlet is for bubbling hydrogen gas through the aqueous solution.

14. An apparatus according to claim 13, wherein the electrolytic cell further comprises a magnetron for treating water within the electrolytic cell.

15. An apparatus according to claim 13, wherein the electrolytic cell comprises a cathode and an anode and a plurality of neutral plates arranged therebetween, each neutral plate being separated from each adjacent neutral plate by a volume for holding an electrolytic solution, wherein said volume contains a mesh membrane to thereby define a cathode-side volume and an anode-side volume, wherein each cathode-side volume is in fluid communication with the first outlet, and wherein the mesh membrane is substantially impervious to gaseous oxygen and hydrogen.

16. An apparatus according to claim 15, wherein the mesh membrane is a nylon mesh membrane.

17. An apparatus according to claim 13, further comprising a flashback arrestor arranged between and in fluid communication with the first outlet and the first inlet.

18. An apparatus according to claim 13, wherein the apparatus comprises a plurality of interchangeable reaction chambers.

19. An apparatus according to claim 18, further comprising a first sensor in communication with the first inlet and a second sensor in communication with the second outlet, wherein the first and second sensors are for determining hydrogen gas flow-rates.

20. An apparatus according to claim 13, wherein the apparatus is for a process for the production of hydrogen comprising:
electrolysing water in an electrolytic cell to produce hydrogen gas and oxygen gas, the electrolytic cell having a first outlet for hydrogen gas;
passing the hydrogen gas from the first outlet of the electrolytic cell to a reaction chamber, the reaction chamber comprising a first inlet for receiving the hydrogen gas from the electrolytic cell and a second outlet for hydrogen gas passing out of the reaction chamber, the reaction chamber containing one or more pieces of a metal or an alloy thereof at least partially submerged in an alkali solution, wherein the first inlet is arranged so that the hydrogen gas bubbles through the alkali solution;
passing the hydrogen gas from the second outlet to a gas-cleaning chamber, the gas-cleaning chamber comprising a second inlet for receiving hydrogen gas from the reaction chamber and a third outlet for hydrogen gas passing out of the cleaning chamber, the gas-cleaning chamber containing an aqueous solution, wherein the second inlet is arranged so that the hydrogen gas bubbles through the aqueous solution; and
recovering hydrogen gas from the third outlet.

21. A vehicular diesel or petrol engine comprising the apparatus according to claim 13, wherein the third outlet is arranged to supply hydrogen gas to a combustion chamber of the engine.

22. An electrical generator comprising a fuel cell, preferably a vehicular electrical generator, comprising the apparatus according to claim 13, wherein the third outlet is arranged to supply hydrogen gas to the fuel cell.

23. A cooking device comprising the apparatus according to claim 13 and a burner head, wherein the third outlet is arranged to supply hydrogen gas to the burner head.

24. A welding device or a plasma cutting device comprising the apparatus according to claim 13 and a gas torch, wherein the third outlet is arranged to supply hydrogen gas to the gas torch.

25. A heating boiler comprising the apparatus according to claim 13 and a combustion chamber comprising a pilot flame, wherein the third outlet is arranged to supply hydrogen gas to the combustion chamber of the boiler.

26. A Stirling engine comprising the apparatus according to claim 13 and a heat engine, wherein the third outlet is arranged to supply hydrogen gas to the heat engine.

* * * * *